Aug. 11, 1970  G. H. HEARON, JR., ET AL  3,523,657

MICROFILM VIEWING APPARATUS

Filed Sept. 15, 1967  2 Sheets-Sheet 1

INVENTORS.
GUY H. HEARON JR.
HANS K. TANNERT
RONALD W. RANDLE

BY *Elliott & Pastoriza*
ATTORNEYS

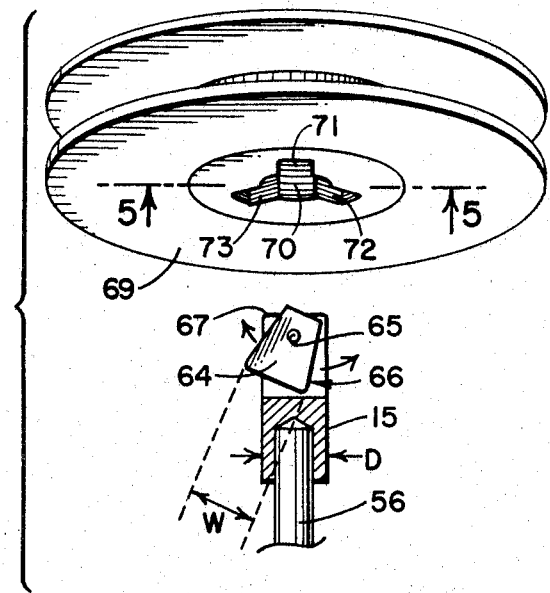
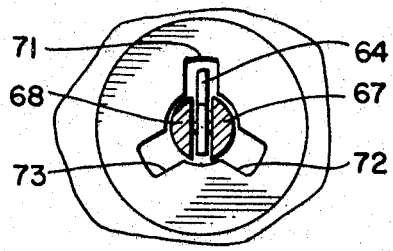
FIG. 5
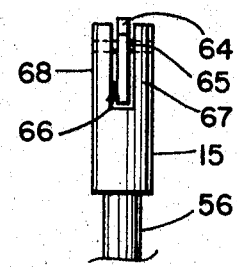
FIG. 6
FIG. 4
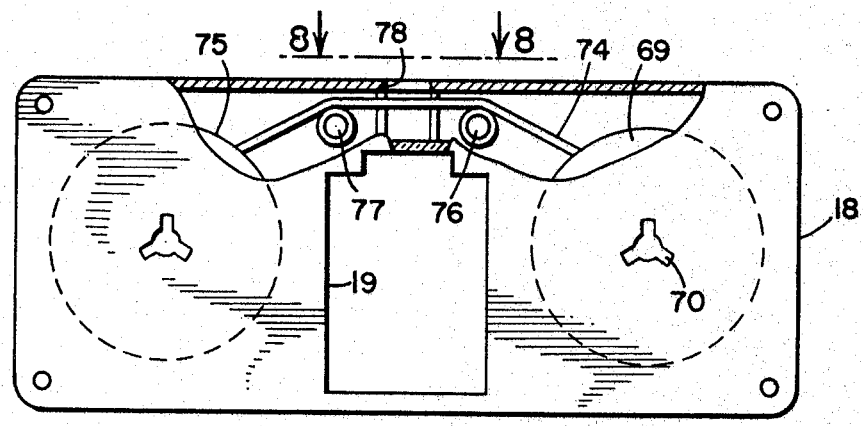
FIG. 7
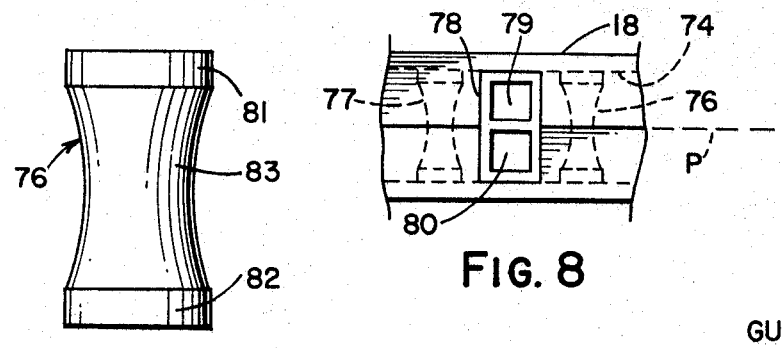
FIG. 9  FIG. 8
INVENTORS:
GUY H. HEARON JR.
HANS K. TANNERT
RONALD W. RANDLE
BY Elliott & Pastoriza
ATTORNEYS.

////# United States Patent Office 3,523,657
Patented Aug. 11, 1970

3,523,657
MICROFILM VIEWING APPARATUS
Guy H. Hearon, Jr., Malibu, and Hans K. Tannert, and Ronald W. Randle, Santa Monica, Calif., assignors, by mesne assignments, to Indian Head Inc., New York, N.Y., a corporation of Delaware
Filed Sept. 15, 1967, Ser. No. 668,122
Int. Cl. B65h *17/02;* G11b *15/30, 23/10*
U.S. Cl. 242—200
2 Claims

ABSTRACT OF THE DISCLOSURE

This disclosure relates to a table top microfilm viewer for viewing film incorporated in a cartridge by manually turning a handle which will position any selected film frame in the viewing apparatus. The manual drive incorporates a clutch which will cause one or the other of the spindles supporting the film reels in the cartridge to turn depending upon the direction of rotation of the manual drive, there being provided a suitable restraining force on the spindle not rotated so that the film in the magazine is maintained under tension. Each of the spindles is so designed as to receive the central opening in the film reel core regardless of the rotative position of the reel so that positioning of the cartridge on the spindles is facilitated. The cartridge itself is symmetrical about a mid-plane and incorporates film twice as wide as the aperture in the viewing apparatus such that only one-half of the film is viewed at a time. The cartridge is then turned over and the other half of the film may be viewed.

---

This invention relates generally to film projecting apparatus and more particularly to an improved, portable, microfilm viewer.

It is now common practice to store information either in the form of pictures or writing on film. By using film, several thousand frames may be stored in a relatively compact area. When it is desired to retrieve given information, the film is simply placed in a projection apparatus and moved to that particular frame containing the desired information.

Film viewing apparatus of this type is generally quite bulky and expensive to manufacture. Usually the entire viewing apparatus, in order to facilitate the actual operation of viewing, is in the form of a console in front of which an operator is seated. The operator must normally thread the film through the viewing apparatus and then start the film in motion. In many instances, the desired frame to be viewed may be towards the end of the film which necessitates running almost the entire film through the viewer before the selected frame is found. As a consequence, there is usually provided a motor drive as well as a manual drive so that the final selection can be made manually when the general portion of the film containing the frame is being viewed. Oftentimes it is necessary to backtrack which normally requires a reversing motor as well as a suitable manual means for turning the film in an opposite direction.

The mechanism for carrying out the foregoing functions has been relatively complicated and contributes towards the heretofore referred to general bulk and expense of presently available viewers.

In addition, in either motor or manual driving of the film, it is important that the film tension not exceed a given value as otherwise the film may break. Therefore, it is desirable in any type of drive means that a suitable mechanism be incorporated to prevent exceeding a given tension on the film.

Another problem which involves a certain amount of an operator's time each time a film is to be viewed is that of positioning the film reels on the spindles. Normally, the film reel core includes a radial slot into which a suitable key protruding from one side of the spindle is received. Thus, in positioning the reel on the spindle, the reel must be rotated to a given position in which the radial slot in the reel core is in alignment with the key. This rotating of the reels results in a winding or unwinding of the film and generally contributes towards difficulty in threading the film into the viewer.

With all of the above in mind, it is a primary object of the present invention to provide a vastly improved microfilm viewing apparatus in which the foregoing problems are substantially reduced or entirely eliminated.

More particularly, it is an object to provide a portable type microfilm viewer adapted to fit on top of any desk wherein the problems heretofore associated with the size of the viewer and corresponding expense are eliminated.

Another important object is to provide a portable microfilm viewer designed such that a selected frame may be readily positioned for viewing without having to run through more than half of the information contained on a film to the end that considerable time is saved in selecting desired information.

Another important object is to provide unique manual drive means for moving the film which incorporates fewer moving parts than has heretofore been deemed necessary and yet wherein all of the advantages and functions of more complicated and expensive drive units are realized.

Another object is to provide a unique manual drive means wherein it is not possible to exceed a predetermined tension force on the film so that the risk of breakage of the film, even though the viewer is mishandled, is eliminated.

Still another object is to provide a microfilm viewing apparatus incorporating unique film reel spindles and cooperating film reels wherein the reels may readily be positioned on the spindles regardless of their rotative positions so that the time to position the film in the viewer is reduced.

Briefly, these and many other objects and advantages of this invention are attained by providing a basic frame supporting structure including a casing and viewing screen and first and second spindles for receiving film reels. The film reels themselves are incorporated in a uniquely designed magazine or cartridge receivable over the spindles. The drive for rotating the spindles includes a single elongated shaft having first and second drive gears or wheels freely mounted on the shaft but subject to some friction such that the wheels will not rotate if a slight restraining force is applied thereto when the shaft is rotated within the wheels. These wheels are respectively coupled to the spindles. A clutch sleeve in turn is provided around the shaft between the wheels and includes a slot receiving a pin on the shaft, the slot being helical such that rotation of the shaft in one direction causes the sleeve to engage one of the wheels and rotation of the shaft in an opposite direction causes the same sleeve to engage the other of the wheels. By this arrangement, a proper restraining force is provided on the wheel free to rotate while a positive drive is provided on the other wheel so that when these motions are transmitted to the spindle, the film will be under proper tension.

In conjunction with the foregoing, the shaft is driven by a unique handle construction incorporating a slip clutch such that only a predetermined turning torque can be applied to the shaft thereby preventing the tension in the film from exceeding a predetermined value.

Each of the spindles for the viewer incorporates a swing key in a bifurcated end so designed as to protrude from one or the other sides of the spindle. The reel core incorporates openings having three radial slots at 120° to each other so designed that the swing key on the spindle will automatically be urged into one of the slots regardless of the relative rotative position of the reel when the same is placed on the spindle.

The reels themselves are incorporated in a cartridge which is symmetircal on either side of a mid-plane. In this respect, the film in the cartridge is twice as wide as the aperture in the viewer such that only one side, or half, of the film is viewed when the cartridge is in one position. Because of the symmetry of the cartridge, it may then be turned over and the other side or half of the film viewed. With this arrangeemnt, twice as much information may be stored on a given length of film and further it is possible by initially selecting the proper half to be viewed to avoid having to run through all of the information on the film in order to arrive at a given selected frame.

Other advantages and unique features of the invention will be evident by now referring to a preferred embodiment thereof as illustrated in the accompanying drawings, in which:

FIG. 4 is a fragmentary side elevation of one of the microfilm viewer spindles partly in cross-section in a position preparatory to receiving a film reel shown above the spindle in perspective;

FIG. 5 is a fragmentary bottom view of the central portion of the film reel core taken in the direction of the arrows 5—5 of FIG. 4;

FIG. 6 is a side elevational view of the spindle looking in a direction at 90° to the view in FIG.4;

FIG. 7 is a plan view partly broken away and partly in section of the film cartridge used with the viewer;

FIG. 8 is a fragmentary front elevational view taken in the direction of the arrows 8—8 of FIG. 7; and, FIG. 9 is an enlarged side elevational view of one of the film rollers incorporated in the cartridge of FIG. 7.

Figure 1:
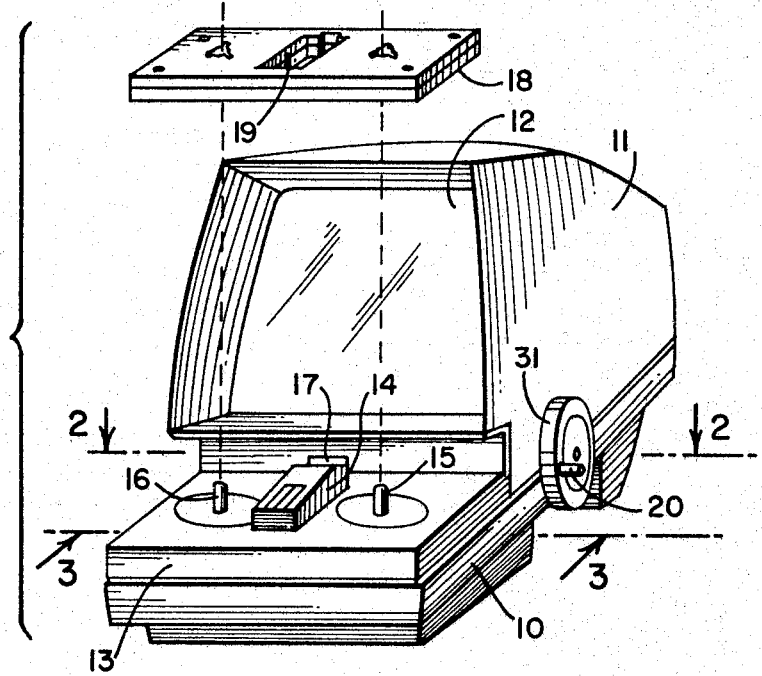
FIG. 1 is a perspective view of the microfilm viewing apparatus of this invention illustrating a cartridge incorporating film to be viewed above the viewer spindles preparatory to being positioned in the viewer.

Referring first to FIG. 1, the viewer includes a base frame 10 supporting a casing 11 having a viewing screen 12. In front of this screen 12 is a film deck 13 incorporating a light projection system 14. Spindles 15 and 16 are disposed on either side of the projection system 14 such that film may be passed between the front end of the light projection system and a film aperture 17 below the screen 12 in the casing. Suitable lens and mirrors are incorporated in the system 14 and rear of the casing to project the image on a film passed in front of the aperture 17 onto the screen 12. The particular type of projection employed does not constitute part of the present invention and therefore is not described in detail.

As illustrated in FIG. 1, the spindles 15 and 16 are arranged to receive suitable film reels incorporated in a film cartridge 18 having a central cutout portion 19 for accommodating the projection system 14 when the cartridge 18 is positioned over the spindles. The spindles themselves are arranged to be rotated by a crank means 20 shown extending from the side of the casing and base 10 of the apparatus.

With the foregoing arrangement, film on reels in the cartridge 18 may readily be viewed by positioning the cartridge 18 over the spindles 15 and 16 and then rotating the hand crank means 20 in one or the other direction to move the film from a pay-out reel to a take-up reel in the cartridge or in an opposite direction.

Figure 2:
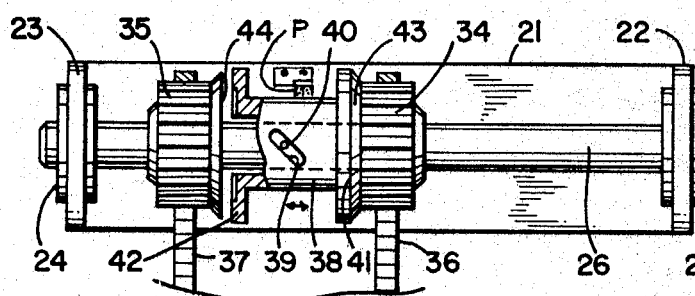
FIG. 2 is a schematic plan view partly in cross-section of a portion of the manual drive for rotating the spindles taken in the direction of the arrows 2—2 of FIG. 1.

The manner in which the spindles 15 and 16 are caused to rotate by the crank means 20 will be better understood by now referring to FIG. 2.

As shown in FIG. 2, there is provided a supporting frame 21 shown in plan and having upturned end flanges 22 and 23 extending out of the plane of the drawing. These end flanges incorporate suitable bushings 24 and 25 for rotatably mounting an elongated shaft 26 between the flanges as shown. The handle means 20 is coupled to the shaft 26 to rotate the same through a suitable slip clutch such that the turning torque applied by the handle on the shaft 26 is limited. This slip clutch includes a first clutch fixture 27 secured for rotation with the shaft 26 and an opposing clutch fixture 28 biased towards the clutch fixture 27 as by a leaf spring 29. Longitudinal movement of the clutch fixture 28 is accommodated by a slot and key 30 shown in a portion of the fixture 27. The arrangement is such that the clutch fixtures 27 and 28 rotate positively with the shaft 26 and are biased towards each other as by the leaf springs 29. The handle 20 itself is secured to a flanged wheel structure 31 having a flat disc shaped central portion 32 disposed between the opposing clutch faces of the clutch fixtures 27 and 28. Other than this frictional engagement with the clutch faces, the wheel 31 is free to rotate independently of the shaft 26 by means of the handle 20. In this respect, the handle 20 itself may be rotatably mounted to a peripheral portion of the wheel 31 as at 33.

With the foregoing arrangement, it will be evident that rotating the wheel 31 by means of the handle 20 will cause the clutch plates 27 and 28 to rotate in view of their frictional engagement therewith and thus rotate the shaft 26. On the other hand, should the shaft 26 resist rotation as a consequence of a reaction force thereon exceeding a predetermined given force, the wheel 31 will simply slip between the opposed clutch fixtures 27 and 28 so that only a given maximum turning torque can be applied to the elongated shaft 26.

Referring now to the shaft 26 itself, it will be noted that there are provided first and second gear type wheels 34 and 35 surrounding the shaft 26. These wheels are mounted in suitable friction bushings such that they are free wheeling about the shaft 26 but are nevertheless in frictional engagement therewith such that a slight restraining force is required on each of the wheels to prevent their rotation when the shaft 26 is rotated. As indicated in FIG. 2, there are provided suitable chains or toothed belts 36 and 37 extending from the wheels 34 and 35. These belts 36 and 37 constitute part of a transmission means such that rotation of one or the other of the wheels 34 and 35 will rotate one or the other of the spindles 15 and 16 described in FIG. 1. The manner in which this transmission functions will be described in detail subsequently.

Between the wheels 34 and 35 and surrounding the elongated shaft 26 is a clutch means in the form of a sleeve 38 provided with an helical slot 39 arranged to receive a radially extending pin 40 from the shaft 26. Opposite ends of the sleeve structure 38 terminate in friction engaging end faces 41 and 42. These faces in turn are designed to frictionally engage respectively end surfaces 43 and 44 associated with each of the wheels 34 and 35. A small friction pad P secured by a leaf spring to the frame 21 engages the surface of the sleeve 38 to provide a slight dragging force on the sleeve when the same is driven by the shaft 26 and pin 40.

In the operation of the clutch structure described in FIG. 2, if the shaft 26 is rotated by the handle 20 in a clockwise direction as viewed from the right, it will be evident that the pin 40 will bear against the upper edge of the helical slot 39, and because of the slight frictional drag by the pad P, the sleeve 38 will be urged to the right. The end face 41 of the sleeve 38 will thus frictionally engage the end surface 43 for the wheel 34 and the wheel 34 will be positively driven in a clockwise direction by the clutch sleeve. It will be noted that movement of the clutch sleeve 38 to the right to engage the end surface of the wheel 34 results in a separation of the friction engaging end face 42 of the sleeve from the corresponding end surface 44 of the wheel 35. The wheel 35 is thus free to rotate in either direction about the shaft 26.

If the handle 20 is revolved in an opposite direction to turn the shaft 26 in a counterclockwise direction as viewed from the right, the pin 40 on the shaft 26 will engage the lower sloping surface of the helical slot 39 thereby urging the sleeve 38 to the left. In this case, the friction engaging end face 42 will engage the end surface 44 of the wheel 35 thereby rotating the wheel 35 in a counterclockwise direction. At the same time, the end engaging face 41 of the sleeve 38 will separate from the end surface 43 of the wheel 34 thereby leaving the wheel 34 free to rotate on the shaft 26.

It is thus evident that depending on the direction of rotation of the shaft 26 by the handle 20, one or the other of the wheels 34 or 35 will be positively driven while the other is free.

Figure 3:
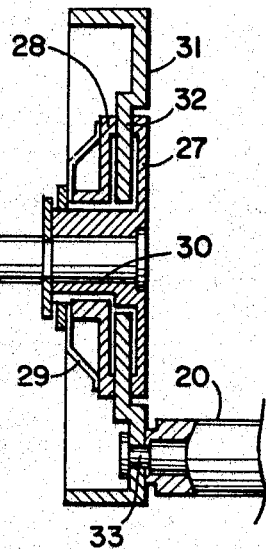
FIG. 3 is a schematic elevational view partly in cross-section of part of the transmission means from the drive structure illustrated in FIG. 2 to the spindles taken generally in the direction of the arrows 3—3 of FIG. 1.
Figure 3:
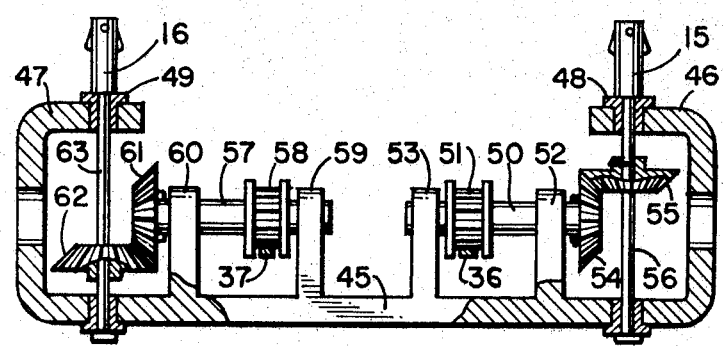

Referring now to FIG. 3, there is illustrated the transmission structure for driving the spindles 15 and 16 of FIG. 1. The view of FIG. 3 is a front elevational view. If FIG. 3 were viewed in plan from above, the structure would be properly oriented with respect to FIG. 2 for receiving the transmission belts 36 and 37. In this respect, the structure of FIG. 3 includes a basic supporting frame 45 which may constitute part of the same frame means 21 for the shaft 26 of FIG. 2. As shown in FIG. 3, the frame includes upwardly and inwardly turned flange portions 46 and 47 for rotatably mounting the spindles 15 and 16 in suitable bushings 48 and 49.

Referring first to the drive for the spindle 15 to the right of FIG. 3, there is provided a shaft 50 having a wheel 51 rotatable with the shaft in suitable end bearing fixtures 52 and 53 which may constitute an integral part of the frame 45. The right hand end of the shaft 50 terminates in a bevel gear 54 meshing with a further bevel gear 55 secured to a shaft 56 for the spindle 15.

Similarly, with reference to the left portion of FIG. 3, there is provided a shaft 57 carrying a gear wheel 58 mounted in suitable bearings 59 and 60 which again may constitute an integral portion of the frame 45. The left end of the shaft 57 terminates in a bevel gear 61 in meshing engagement with a further bevel 62 secured to a shaft 63 for the spindle 16. It will be noted that the position of the bevel gear 62 on the shaft 63 is reversed with respect to the position of the bevel gear 55 on the shaft 56 for the spindle 15.

With reference now to both FIGS. 2 and 3, the transmission belts 36 and 37 are respectively passed about the wheels 51 and 58 of FIG. 3 back to the wheels 34 and 35 of FIG. 2. When the handle 20 of FIG. 2 revolves the shaft 26 in a clockwise direction as viewed from the right in FIG. 2 to cause the sleeve 38 to engage and rotate the wheel 34, the wheel 51 of FIG. 3 will be rotated in a clockwise direction as viewed from the right. Rotation of the bevel gear 54 in this direction will result in rotation of the bevel gear 55 and the spindle 15 in a clockwise direction as viewed from above such that the film will be pulled from left to right past the aperture 17 when the cartridge 18 is positioned on the spindles of FIG. 1.

When the handle 20 rotates the shaft 26 in a counterclockwise direction as viewed from the right in FIG. 2, the wheel 35 will be engaged by the sleeve 38 and the wheel 34 will be free. The wheel 35 will be rotated in a counterclockwise direction with the shaft 26 resulting in rotation of the wheel 58 of FIG. 3 in a counterclockwise direction as viewed from the right. This motion will be imparted to the bevel gears 61 and 62 to rotate the spindle 16 in a counterclockwise direction when viewed from above such as to move the film from right to left past the aperture 17 in the apparatus of FIG. 1.

It will be evident from the description of this unique clutching transmission means that the operator need simply move the handle 20 in one direction or the other to cause the film to be wound on one reel or the other, the slight frictional engagement of each of the wheels 34 and 35 with the shaft 26 providing sufficient restraining force so that the film will always be under a slight tension. In other words, the change in diameter of the film on the reel from which the film is payed out will not cause any problem since the pay-out reel is always free with only a slight restraining frictional force exerted thereon whereas the take-up reel is positively driven.

Referring now to FIGS. 4, 5, and 6, the unique spindle construction constituting a part of the film viewing apparatus of this invention is shown together with a corresponding film reel for cooperation with the spindle. Referring first to FIG. 4, there is shown in detail the spindle 15. The spindle 16 of FIGS. 1 and 3 is identical and thus description of one will suffice for both. The spindle in FIG. 4 terminates in a bifurcated end within which there is provided a swing key 64 pivoted at 65 with a channel 66 defined by the bifurcated end. One portion of the end defining a side of the channel is shown at 67 in FIG. 4. The other side defining the bifurcated end is illustrated in FIGS. 5 and 6 at 68. The spindle shaft 56 is shown secured to the spindle proper 15 in both FIGS. 4 and 6.

It will be noted in FIG. 4 that the lower end of the swing key 64 has a width W greater than the diameter D of the spindle 15. As a consequence, one lower edge of the swing key 64 will protrude from one side or the other of the spindle channel 66 when its opposite side is flush with the surface of the spindle. It should be understood that the swing key 64 is free to swing in either direction about the pivot 65 as indicated by the arrows in FIG. 4 and will normally be held in a central position by gravity.

Shown above the spindle of FIG. 4 is a reel 69 in a position preparatory to being received on the spindle. As shown, the reel includes a core opening 70 having three radially diverging slots 71, 72, and 73 at 120° to each other. As a consequence of the disposition of these slots, when the film reel is placed over the spindle, the swing key 64 will be urged automatically into one of the three slots regardless of the relative rotative position of the reel when received over the spindle.

The foregoing will become clear by reference to FIG. 5 wherein it will be noted that the swing key 64 has been received in the slot 71, this slot 71 being opposed by the inside surface of the central core opening which surface swings the swing key 64 such that the protruding portion thereof is received in the slot. It can readily be visualized that if the reel were in a different rotative position, when the same is placed over the spindle, the swing key must be forced into one of the three slots, the contouring of the core opening and key being smoothly rounded or slightly radiused such that the swing key will be biased directly into the slot if it is not initially in complete alignment therewith. In this respect, it is not necessary that the spindle always be vertical since the swing key is urged into a slot even if it is not initially hanging vertically.

It will be evident that the film reels may always be readily received over the spindles regardless of their relative rotative positions. Further, it should be understood that the central core opening 70 as illustrated in FIG. 4 extends entirely through the reel, the reel being symmetrical about a mid-plane passing between the reel flanges. Thus, the reel may be turned over and positioned on the spindle in the same manner as described.

Referring now to FIG. 7, the reel 69 of FIG. 4 is shown in its normal position within the cartridge 18. As shown, a film 74 passes from the reel 69 to a second reel 75 which would normally be received over the spindle 16 of FIGS. 1 and 3 when the cartridge 18 is positioned in the viewer. Rollers 76 and 77 are positioned in the magazine on each side of a window structure 78 such that the film 74 passes over these rollers and is held in a consistent plane under a slight tension. By the use of these rollers, there is eliminated the need for the usual pressure plates and the like for the film 74, the portion of film between the rollers 76 and 77 being free of engagement with any portion of the cartridge 18.

In the preferred embodiment of the invention, the cartridge 18 and reels are designed for a film which is approximately twice the width of the aperture 17 for the viewer of FIG. 1. As a consequence, only one-half of the film is in registration with the aperture and in order to expose the other half of the film, the entire cartridge 18 must be removed from the spindles and turned over and repositioned on the spindles.

For example, with reference to FIG. 8, it will be noted that the window structure 78 includes an upper and lower window 79 and 80 which is in registration with respective halves of the film 74 passing over the rollers 76 and 77 the latter elements being indicated in dotted lines. It will be evident that the cartridge 18 is symmetrical about the plane P of FIG. 8 so that simply turning the cartridge over will result in one or the other of the windows 79 or 80 being in registration with the aperture in the viewer when the cartridge is received on the spindles.

FIG. 9 shows one of the rollers 76 in detail wherein it will be noted that the ends of the rollers indicated at 81 and 82 engage the edges of the film, the central portion of the roller being concave as indicated at 83. This design avoids the major portion of the roller actually contacting the information bearing portion of the film and thus conserves and maintains the life of the film.

A particular advantage of providing a cartridge structure incorporating a film of twice the normal viewing width is that it is not necessary to run through more than one half of all of the information recorded on the film in order to reach a desired frame. In this respect, it is, of course, assumed that the cartridge is initially positioned with the proper half of the film incorporating the desired frame in position for viewing.

It should be understood in connection with the use of the cartridge 18 that the unique spindle keying construction described in FIGS. 4, 5, and 6 constitutes an important part of the combination in that the cartridge can readily be positioned on the spindles without necessitating any appreciable rotation of the reels in order to effect the positioning on the spindles. This latter problem of rotating the reels would cause considerable difficulty if cartridges were used with conventional spindles.

The overall operation of the film viewing apparatus will be evident from the foregoing description. In order to reproduce any particular image frame on a film, it is only necessary to select the proper cartridge and position the same over the spindles 15 and 16 of FIG. 1 in accord with the half portion of the film containing the desired frame. The operator can then turn on the projection light and traverse the entire film in either direction by simply manually rotating the handle 20 of FIG. 1 in one direction or the other. After the selected frame has been viewed, the cartridge can be easily removed and stored and another cartridge substituted if information stored on the latter cartridge is to be read. No threading is necessary in either inserting or removing the cartridge.

The unique clutch mechanism described in FIG. 2 assures that proper tension is at all times provided on the film and yet positive driving of the film in one direction or the other is assured. Removing and flipping of the cartridge is greatly facilitated as a consequence of the unique spindle structure described. Further, should the tension on the film become too great for any reason, the increased turning torque will be limited to a safe value as a consequence of the handle slip clutch arrangement described in conjunction with FIG. 2. Also, and as mentioned, the unique use of a cartridge having film of twice normal width such as a 16 mm. film will enable a substantial amount of information to be stored in a compact space and will also facilitate the selecting of any desired frame on the film half.

The entire film viewing apparatus incorporates a minimum of movable parts and thus is economical to manufacture and reliable in operation.

It will be evident accordingly that all of the various objects as well as additional objects and advantages have been fully realized by the embodiment as described.

What is claimed is:

1. A microfilm viewing apparatus comprising, in combination: a supporting frame means rotatably mounting first and second spindles, each of said spindles defining a vertical channel at its upper end; a laterally movable means mounted in said channel and having a width greater than the diameter of said spindle such that one or the other sides of said movable member protrude from said channel when its opposite side is flush with the surface of said spindle; a cartridge incorporating take-up and pay-out reels holding film to be viewed and receivable on said spindles, each of said reels having a central core opening with three divergent radial slots at 120° with each other whereby said reel will be receivable over a corresponding one of said spindles regardless of its rotative position, said movable means being automatically urged into one of said three slots; a clutch drive means for said spindles including an elongated shaft mounted for rotation in clockwise and counterclockwise directions in said frame means; first and second drive wheels frictionally mounted along said shaft in spaced relationship such that said shaft may rotate without turning said wheels if a slight restraining force is applied to said wheels; a clutch member in the form of a sleeve having friction engaging end faces disposed around said shaft between said wheels, said sleeve having an helical slot in its surface, said shaft having a radially extending pin received in said slot; transmission means respectively coupling said first and second wheels to said first and second spindles such that rotation of said elongated shaft results in said pin urging said sleeve longitudinally along said shaft until one of its said friction engaging end faces engages one of said wheels thereby rotating said wheel and corresponding spindle coupled thereto; and a handle means for manually rotating said elongated shaft, said handle means including friction clutch means coupling said handle means to said shaft such as to permit said handle means to slip relative to said shaft if a predetermined turning force on said shaft is exceeded, whereby one or the other of said spindles is caused to rotate depending upon whether said handle is rotated in a clockwise or counterclockwise direction.

2. An apparatus according to claim 1, in which said film has a width at least twice the width of the aperture in said viewing apparatus such that only one half the width of said film is viewable when said cartridge is positioned on said spindles, said cartridge being symmetrical about a mid-plane passing through the longitudinal center of said film and reels such that said cartridge may be turned over and repositioned on said spindles to enable the other half of said film to be viewed in said apparatus, said cartridge having upper and lower windows registering with respective halves of said film.

(References on following page)

References Cited

UNITED STATES PATENTS

| | | |
|---|---|---|
| 1,041,184 | 10/1912 | Spiro. |
| 1,969,484 | 8/1934 | Stewart _____ 352—78 |
| 2,012,437 | 8/1935 | Segal _____ 242—67.4 |
| 2,197,779 | 4/1940 | Coxe _____ 242—84.44 |
| 2,324,453 | 7/1943 | Albers. |
| 2,336,278 | 12/1943 | Mihalyi _____ 242—76 X |
| 2,624,231 | 1/1953 | Kingston _____ 352—78 |
| 3,074,311 | 1/1963 | Kapilow. |
| 3,099,397 | 7/1963 | Abbott. |
| 3,354,776 | 11/1967 | Smitzer et al. _____ 242—55.13 X |
| 3,394,899 | 7/1968 | Schoenmakers _____ 242—55.13 |

OTHER REFERENCES

Tesla: German printed application 1,136,843, September 1962.

GEORGE F. MAUTZ, Primary Examiner

U.S. Cl. X.R.

242—67.4, 68.3, 201; 352—78